(12) United States Patent
Van Der Horst et al.

(10) Patent No.: US 6,679,941 B2
(45) Date of Patent: Jan. 20, 2004

(54) PROCESS FOR PREPARING PRODUCTS CONTAINING MINERAL PARTICLES AND ASPHALTENES-CONTAINING BINDER

(75) Inventors: Willem Van Der Horst, Amsterdam (NL); Marinus Johannes Reynhout, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/333,801

(22) PCT Filed: Jul. 12, 2001

(86) PCT No.: PCT/EP01/08098

§ 371 (c)(1),
(2), (4) Date: Jan. 24, 2003

(87) PCT Pub. No.: WO02/08337

PCT Pub. Date: Jan. 31, 2002

(65) Prior Publication Data

US 2003/0160218 A1 Aug. 28, 2003

(30) Foreign Application Priority Data

Jul. 26, 2000 (EP) .............................................. 00306348

(51) Int. Cl.⁷ .............................................. C09D 195/00
(52) U.S. Cl. .................................................. 106/284.01
(58) Field of Search ..................................... 106/284.01

(56) References Cited

U.S. PATENT DOCUMENTS 6,159,279 A * 12/2000 Malot et al. ............ 106/284.01

FOREIGN PATENT DOCUMENTS

| FR | 2208966 | 8/1974 | ............. C10C/3/00 |
| WO | 99/51678 | 10/1999 | ............ C08L/95/00 |
| WO | 00/46164 | 8/2000 | ............ C04B/26/26 |

* cited by examiner

Primary Examiner—David Brunsman

(57) ABSTRACT

A process for preparing products containing mineral particles and asphaltenes-containing binder, said process involves (a) preparing a fluid mixture of mineral particles and asphaltenes-containing binder by mixing (i) solid particles containing from 10 to 95% by weight of asphaltenes-containing binder having a penetration of less than 15 dmm and from 90 to 5% by weight of small particles having an average particle size of less than 5 millimeter, with (ii) hot mineral particles having a temperature from 100 to 300° C., and (b) use of the fluid mixture for preparing products containing mineral particles and asphaltenes-containing binder.

10 Claims, No Drawings

PROCESS FOR PREPARING PRODUCTS CONTAINING MINERAL PARTICLES AND ASPHALTENES-CONTAINING BINDER

This is a 371 filing of PCT/EP01/08098.

The present invention relates to a process for preparing products containing mineral particles and asphaltenes-containing binder.

BACKGROUND OF THE INVENTION

Bitumen is well known for use as binder for mineral particles. Typically, bitumens contain 5% to 25% by weight of asphaltenes (page 90 of The Shell Bitumen Handbook, September 1991). Generally, bitumen based products are prepared by mixing fluid hot bitumen with hot aggregate (pages 189–196 of The Shell Bitumen Handbook, September 1991). The fluid hot bitumen is usually obtained in the refinery and subsequently transported as a hot fluid from the refinery to the mixing plant. In such a set-up, the bitumen is handled, transported and stored hot.

It has now been found possible to handle, store and transport asphaltenes-containing binder at ambient temperature.

Non-prepublished patent application PCT/EP00/00734 having international publication number WO 00/46164, describes construction elements comprising from 70 to 99% by weight of solid particles and from 30 to 1% by weight of a hydrocarbonaceous binder, which binder most preferably has a penetration of less than 10 dmm according to ASTM D 5 at 25° C. It is described that an advantageous method of preparing compositions or construction elements comprises using the hydrocarbonaceous binder in the form of binder-containing particles, more specifically in the form of binder containing granulate or powder. It has not been specified how to use the binder-containing particles.

SUMMARY OF THE INVENTION

The present invention relates to a process for preparing products containing mineral particles and asphaltenes-containing binder which process comprises (a) preparing a fluid mixture of mineral particles and asphaltenes-containing binder by mixing solid particles (i) containing from 10 to 95% by weight of asphaltenes-containing binder having a penetration of less than 15 dmm and from 90 to 5% by weight of small particles having an average particle size of less than 5 millimeter, with hot mineral particles (ii) having a temperature from 100 to 300° C., and (b) use of the fluid mixture for preparing products containing mineral particles and asphaltenes-containing binder.

The presence of asphaltenes is established by test method IP 143/96. The penetration is measured according to ASTM D 5 at 25° C.

The process of the present invention has the advantage that the binder can be handled, stored and transported at ambient temperature. It has been found that the combination of a hard binder and the presence of a substantial amount of small particles having an average particle size of less than 5 millimeter, can produce strong particles which tend not to stick together. Such strong, non-sticking solid particles (i) are easier to handle. Contrary to the hot fluid which is generally being used at present, the solid particles containing hard asphaltenes-containing binder and a substantial amount of small particles, can easily be transported over long distances and/or stored for a long time.

DETAILED DISCUSSION OF THE INVENTION

In the process of the present invention, the solid particles (i) contain from 10 to 95% by weight of asphaltenes-containing binder having a penetration of less than 15 dmm according to ASTM D 5 at 25° C. and from 90 to 5% by weight of small particles having an average particle size of less than 5 millimeter. The amounts are based on total amount of solid particles (i). The small particles are different from the asphaltenes-containing binder, and are solid at ambient temperature.

Although particles having a larger size can be present in the solid particles (i), at least 5% by weight of small particles having the required particles size should be present. Preferably, at least 5% by weight of small particles is present having an average particle size of less than 1 millimeter, more preferably at least 5% by weight of small particles having a particle size of at most 63 micrometer, so-called filler. The particle sizes are measured by sieving with sieves having openings of the indicated size. The amount of these small particles present in the solid particles (i) preferably is at least 10% by weight, more preferably at least 20% by weight, more preferably at least 30% by weight. The amount of these small particles present in the solid particles (i) is preferably at most 80% by weight, most preferably at most 70% by weight. Preferably, the solid particles (i) contain the asphaltenes-containing binder and the solid particles in a volume ratio from 5:1 to 1:5, more preferably 3:1 to 1:3.

If the fluid obtained in step (a) is to be used for preparing construction elements, it is particularly advantageous that the solid particles contain filler.

The quantity and quality of the filler determines to a large extent the properties of the final product obtained such as its tensile strength and its compression strength. In a preferred mode of operation, there is a wide range of solid particles (i) which are each to be combined with the same type or mix of mineral particles (ii). In this set-up, the desired final product can be prepared by choosing the right kind of solid particles (i) while the further features of the process, including the type or mix of mineral particles (ii), can remain unchanged. The properties of the final product obtained can be influenced by the binder and by the small particles present in the solid particles (i). This set-up is especially advantageous in the manufacture of construction elements, in which industry a wide range of similar products is produced. The use of tailored solid particles (i) makes it possible to produce a wide range of final products without the need to change the process other than using a different kind of solid particles (i). Such process comprises preparing different products containing mineral particles and asphaltenes-containing binder, by (a) mixing different solid particles (i) containing from 10 to 90% by weight of asphaltenes-containing binder having a penetration of less than 15 dmm and from 90 to 10% by weight of small particles having an average particle size of less than 5 millimeter, with the same kind of hot mineral particles (ii).

The small particles can be chosen from a wide range of materials. Preferred materials are coke and mineral particles such as clay, silt, cement and limestone. Further materials which may be employed as the small particles are powdered metal, powdered wood and crushed shells. The small particles preferably are mineral particles as mineral particles have a strong anti-sticking effect. It is thought that the mineral particles are preferentially present on the outer surface of the solid particles (i), which improves the anti-sticking effect of the small particles.

The suitable dimensions of the solid particles (i) depend on the conditions at which the solid particles are to be handled further. Heat transfer during mixing is better if the solid particles are small, which results in a shorter mixing time. Generally, it is preferred that the solid particles (i) have, on weight average, a weight of less than 500 grams, more preferably less than 200 grams. Most preferably, the solid particles have, on weight average, a weight of at most 100 grams.

The solid particles (i) may be in any convenient shape or form e.g. they may be in the form of pellets, bars, tubes or fibers.

The asphaltenes-containing binder can be any asphaltenes-containing binder. Preferably, the binder has a penetration of at most 10 dmm at 25° C., more preferably of less than 10 dmm and most preferably less than 8 dmm. Further, the binder preferably has a penetration of at least 0.1 dmm at 25° C., more preferably at least 1 dmm, more preferably at least 2 dmm.

The penetration values below 2 dmm can be measured by measuring at 40° C. and subsequently extrapolating the results.

The solid particles (i) are solid at ambient temperature. The softening point of the binder present in the solid particles, determines at which temperature the solid particles (i) become fluid. The binder according to the present invention preferably has a softening point, measured according to the ring and ball test of ASTM D 36, of at most 157° C., more preferably at most 150° C., more preferably at most 120° C., most preferably at most 100° C. Further, the binder preferably has a softening point of at least 50° C., more preferably at least 70° C.

The binder can be prepared in any way obvious to someone skilled in the art, provided that the binder obtained has the required hardness.

A process by which the binder can be prepared is deasphalting, more particularly propane deasphalting. In this process, a residue from distillation of crude oil is treated with solvent under controlled conditions such that bitumen binder is precipitated. The solvent preferably is propane, propane-butane mixtures or pentane. Most preferably, the solvent is propane. The residue is usually residue from an atmospheric distillation tower. The process is primarily used for crude oils of relatively low asphalt content. The process can suitably be carried out as a countercurrent liquid-liquid extraction. Further details of the process are well known to someone skilled in the art. Suitable processes have been described in Kirk-Othmer Encyclopedia of Chemical Technology, Volume 3, pages 297–298.

The asphaltenes-containing binder preferably contains (i) from 15 to 95% by weight, based on total binder, of asphaltenes, as determined according IP 143/96, which asphaltenes contain at least 60% aromatic carbon, and (ii) from 5 to 85% by weight, based on total binder, of further hydrocarbons as determined according IP 143/96. The percentage of aromatic carbon atoms present in the asphaltenes is measured by separating off the asphaltenes in the binder as described in IP 143/96, dissolving a sample of the asphaltenes in carbon disulphide or chloroform and assessing the percentage of aromatic carbon by $^{13}C$ NMR.

The asphaltenes comprise hydrogen, carbon and optionally other atoms. Specifically, the asphaltenes can contain up to 15% by weight of atoms other than hydrogen and carbon, more specifically sulphur, nitrogen and oxygen, preferably at most 12% by weight, most preferably at most 10% by weight, based on asphaltenes.

Generally, the further hydrocarbons present in the above preferred binder, can contain up to 15% by weight of atoms other than hydrogen and carbon, more specifically sulphur, nitrogen and oxygen, preferably at most 12% by weight, most preferably at most 10% by weight, based on further hydrocarbons.

Preferably, the binder contains at least 20% by weight of asphaltenes, based on total binder. More preferably, the binder contains at least 25% by weight of asphaltenes. The amount of asphaltenes is preferably up to 95% by weight, more preferably up to 70% by weight, more preferably up to 60% by weight, more preferably up to 50% by weight, more preferably up to 45% by weight, most preferably at most 40% by weight.

The asphaltenes-containing binder containing (i) from 15 to 95% by weight of asphaltenes-containing at least 60% aromatic carbon, and (ii) from 5 to 85% by weight of further hydrocarbons, can be prepared by subjecting hydrocarbons to thermal cracking. Preferably, a residual hydrocarbon fraction is subjected to thermal cracking. The thermally cracked product can be used as such, or in combination with any other hydrocarbon fraction as long as the required hardness is achieved.

Preferably, the binder consists at least partly of product obtained by subjecting hydrocarbons to thermal cracking. Most preferably, the binder consists of product obtained by subjecting hydrocarbons to thermal cracking. Although in such case part of the thermally cracked product can be used, the binder only contains product which has been thermally cracked.

Thermal cracking is preferably carried out by pre-heating a hydrocarbon fraction to a temperature from 350 to 500° C., maintaining the pre-heated oil at such conditions as to cause thermal cracking and subsequently separating off one or more light fractions. Thermal cracking of residual fractions usually involves a temperature of between 300 and 600° C. The pressure can be in the range from 1 to $100 \times 10^5$ N/m$^2$ (bar), preferably in the range from 2 to $20 \times 10^5$ N/m$^2$ (bar). Thermal cracking is preferably carried out in a soaker. The thermally cracked product as such can be used as binder, or the binder can be only a part of the thermally cracked product. In the latter case, the binder is separated from the thermally cracked product in any convenient way. Preferably, the binder is produced by separating off the light fractions by flash distillation, more preferably by vacuum flash distillation.

Another process by which the binder can be obtained comprises subjecting a residual fraction to hydroconversion at a temperature in the range from 200 to 450° C. and a pressure in the range from 50 to $200 \times 10^5$ N/m$^2$ (bar), optionally preceded by hydrodemetallization. Preferably, the hydroconversion is hydrodesulphurization.

The solid particles (i) can be prepared in any suitable way. A method by which the solid particles can be prepared, comprises mixing the asphaltenes-containing binder in the form of a powder with the small particles and subsequently compacting the mixture of powders. Solid particles of any desired size and dimension can be prepared in this way. Compacting can be carried out with the help of a machine for preparing coal briquettes from coal powder, or in an extrusion machine.

Generally, the preferred method of preparing the solid particles (i) comprises (1) preparing a fluid mix of small particles and asphaltenes-containing binder, (2) allowing the fluid to cool, and optionally (3) preparing solid particles of the desired shape and size from the cooled mix.

A method which falls within this general preferred method, comprises (i) preparing a fluid mix of small particles and asphaltenes-containing binder, (ii) extruding the fluid mix, and (iii) cutting the extrudates into particles of the appropriate size. Cooling of the mix in order to obtain the solid particles (i) can be carried out in step (ii), (iii) and/or thereafter. A suitable cooling method comprises treating the intermediate product or final product with water. Most preferably, the cutting of the extrudates is carried out in water.

A further method falling within this general, preferred method comprises (i) preparing a fluid mix of small particles and asphaltenes-containing binder, and (ii) allowing the fluid to cool either as separate particles or as a sheet. The latter is subsequently crushed to obtain separate particles. Cooling can be achieved by exposing the particles or sheet to air, for example by spreading them out on a moving belt, or by treating them with water. A preferred method comprises allowing the fluid mix to form droplets which fall on a moving belt. Preferably, the belt is continuously cooled. A suitable method for cooling the belt comprises exposing one side of the belt to a cooling liquid such as water, while the other side carries the binder particles.

If fluid binder is used in the preparation of the solid particles (i), the preparation is preferably carried out at a refinery where the binder is obtained as a fluid. This makes that the binder needs not to be handled and transported as a hot fluid, or to be heated again.

The solid particles (i) preferably have a temperature of at most 100° C. before being mixed with the hot solid mineral particles (ii), more preferably at most 60° C. and even more preferably at most 40° C. Most preferably, the solid particles (i) will have ambient temperature (20° C.).

In order to change the properties of the final product, the solid particles (i) may contain polymer. The polymer can be present in the solid particles (i) or can be added when the solid particles (i) are mixed with the hot mineral particles (ii). Polymer which can be present comprises elastomers, amorphous polyolefins, ethylene vinyl acetate copolymers and polymers containing available epoxy groups, e.g. as described in patent specification WO 96/28513.

The final product can contain a wide range of further components. These further components can be added by being inherently present in the solid particles (i) or can be added separately to the mix. Further components comprise shells, wood particles, waxes, glycerine and other additives which are well known to the skilled person to be beneficial in the final product. Such components comprise conventional pigments and fibres. The fibres are preferably cellulose fibres. The pigment can be any well known pigment giving the final product the desired colour. Furthermore, the further components can contain electrically conductive solid particles to make the composition electrically conductive for example graphite particles, or magnetic materials to prepare a magnetic composition, for example iron oxide particles. If the final product is to be used for heat insulation, the composition can contain solid particles increasing its heat insulation properties. If the final product is to be used for conducting heat, the composition can contain solid particles increasing its heat conductivity properties. In order to increase the load-carrying properties of products of the process according to the present invention, the products can additionally contain reinforcements such as steel bars, steel fabric, polymers, glass fibres, carbon fibres, carbon flakes and/or carbon fabric.

Any mineral particles which can be heated to a temperature from 100 to 300° C., can be used as the mineral particles (ii) in step (a). The mineral particles (ii) preferably are such that the mineral particles present in the solid particles (i) and those present in (ii), together constitute a combination of mineral particles having a particle size of at most 63 micrometers (so-called filler) and mineral particles having a particle size in the range from 63 micrometers to 2 millimeter (so-called sand) and mineral particles having a particle size in the range from 2 to 10 millimeter (so-called stones). Preferably, the amount of each of sand and stones in the final product is in the range from 10 to 90% wt, while the amount of filler preferably is in the range from 2 to 25% wt (the combination to total 100% wt), based on total amount of mineral particles present in the final product. Mineral particles having a particle size of more than 8 millimeter can be present as well, for example if the fluid mixture of mineral particles and asphaltenes-containing binder is to be used for a special purpose such as for making relatively large objects.

The hot mineral particles of the present invention have a temperature from 100 to 300° C. before being contacted with the solid particles (i). A temperature of more than 300° C. is undesirable for safety reasons. At a temperature of less than 100° C., the total composition will generally not obtain a temperature which is high enough to obtain a homogeneous mix. Preferably, the hot mineral particles for use in the present invention will have a temperature from 120 to 280° C., more preferably from 150 to 260° C.

The mixing is preferably carried out at a mixing plant as conventionally used in the asphalt industry. Preferably, the mixing of the process of the present invention is carried out during a relatively short time. Generally, the total mixing time should be less than 10 minutes, preferably at most 5 minutes, most preferably at most 4 minutes. The total mixing time starts when all components have been added.

During mixing, the ratio by volume of solid particles (i) to hot mineral particles (ii) preferably is from 2:1 to 1:200, more preferably from 1:1 to 1:100.

The product of the present invention can be used for all purposes for which products containing mineral particles and hard asphaltenes-containing binder, can be used generally. The process of the present invention is especially suitable for preparing construction elements, including building elements. In step (b) of the process of the present invention, the fluid mixture of asphaltenes-containing binder and mineral particles is preferably used for preparing construction elements. A construction element is a self-contained component of fixed dimensions, which is used in construction. Construction elements include building elements. Preferred construction elements are pipes, tiles, roof tiles, paving stones (pavers), flagstones, bricks, foundations, boards, gutters and/or conduits. Road surfaces, floors and roofs are not construction elements. Preferably, the construction element will have dimensions of at most 5 meters by at most 5 meters by at most 40 meters, more specifically dimensions of at most 1 meter by at most 1 meter by at most 2 meters. Preferably, the element will have dimensions of at most 1 meter by at most 1 meter by at most 0.5 meter. Most preferably, the element will have dimensions of at most 20 centimeter by at most 20 centimeter by at most 10 centimeter. The construction element preferably is a block. Products prepared according to the process of the present invention are especially suitable for use in paving stones and roof tiles in view of the good flexural strength of the compositions, especially the good flexural strength retained after having been exposed to water optionally containing salt and/or (strong) acid, more especially such exposure at elevated temperature.

The invention will now be illustrated further by means of the following Examples. The examples should not be construed to limit the scope of the invention.

EXAMPLE 1

An asphaltenes-containing binder was obtained by thermal cracking of residual fraction of a crude of Middle East origin having a boiling point of 520° C. or more, and subsequently removing the light fractions by subjecting the product to vacuum flashing. The binder obtained had a boiling point of 520° C. or more under atmospheric conditions.

The asphaltenes-containing binder contained 25% wt of asphaltenes, had a penetration of 6–7 dmm at 25° C. and had a ring and ball softening point of 90° C. The asphaltenes had 65% by weight of carbon atoms in aromatic rings.

The solid asphaltenes-containing binder was ground to obtain the binder in powder form. The particles of the powder had a particle size from 0.1 to 1000 micrometer. Mineral particles having a particle size of at most 63 micrometer, so-called filler, were mixed with the binder powder in a volume ratio of about 1:9. The mix contained 10% wt of small particles and 90% wt of asphaltenes-containing binder, which were homogeneously mixed. The mix was pressed together in a mould to obtain solid particles having the shape of a briquette.

The solid particles containing asphaltenes-containing binder and small particles obtained in this way, were easy to handle in that they neither broke nor stuck together during normal handling in the laboratory at ambient (20° C.) temperature.

EXAMPLE 2

An asphaltenes-containing binder was obtained by thermal cracking of a residual fraction of a crude of Middle East origin having a boiling point of 520° C. or more, and subsequently removing the light fractions by subjecting the product to vacuum flashing. The binder obtained had a boiling point of 520° C. or more under atmospheric conditions.

The asphaltenes-containing binder contained 25% wt of asphaltenes, had a penetration of 6–7 dmm at 25° C. and had a ring and ball softening point of 90° C. The asphaltenes had 65% by weight of carbon atoms in aromatic rings.

The binder was heated to a temperature of 200° C. to obtain a fluid, and subsequently mixed with mineral particles having a particle size of at most 63 micrometer, so-called filler, in a volume ratio of about 2:1. The fluid mix contained 30% wt of small particles and 70% wt of asphaltenes-containing binder.

The fluid mix was poured into a vessel. From the vessel droplets of the mix fell on a cold surface. The droplets solidified on the steel belt. The weight of the solid particles obtained ranged from 0.01 to 0.5 grams.

The solid particles containing asphaltenes-containing binder and small particles obtained in this way, were easy to handle in the laboratory in that they neither broke nor stuck together during normal handling at ambient temperature.

What is claimed is:

1. A process for preparing products containing mineral particles and asphaltenes-containing binder of which said process comprises (a) preparing a fluid mixture of mineral particles and asphaltenes-containing binder by mixing solid particles (i) containing from 10% to 95% by weight of asphaltenes-containing binder having a penetration of less than 15 dmm and from 90% to 5% by weight of small particles having an average particle size of less than 5 millimeter, with hot mineral particles (ii) having a temperature from 100° C. to 300° C., and (b) use of the fluid mixture for preparing products containing mineral particles and asphaltenes-containing binder.

2. The process of claim 1, in which process step (b) comprises use of the fluid mixture for preparing construction elements.

3. The process of claim 1, in which process each solid particle (i) has, on weight average, a weight of less than 500 grams.

4. The process of claim 1, in which process the solid particles (i) have a temperature of at most 60 ° C. before being mixed with the hot mineral particles (ii).

5. The process of claim 1, in which process the asphaltenes-containing binder has a penetration of less than 10 dmm.

6. The process of claim 1, in which process the small particles present in (i) are mineral particles.

7. The process of claim 1, in which process the small particles present in (i) have a particle size of at most 63 micrometers.

8. The process of claim 1, in which process the solid particles (i) contain the asphaltenes-containing binder and the solid particles in a volume ratio from 5:1 to 1:5.

9. The process of claim 1, in which process in step (a) the ratio by volume of solid particles (i) to hot mineral particles (ii) is from 1:1 to 1:100.

10. The process of claim 1, in which process the hot mineral particles (ii) have a temperature from 120° C. to 280°C.

* * * * *